(12) United States Patent
Greiner et al.

(10) Patent No.: US 10,472,274 B2
(45) Date of Patent: Nov. 12, 2019

(54) COATED ARTICLE HAVING CERAMIC PAINT MODIFIED SURFACE(S), AND/OR ASSOCIATED METHODS

(71) Applicant: Guardian Europe S.A.R.L., Bertrange (LU)

(72) Inventors: Ralf Greiner, Muldestausee (DE); Mario Olbrich, Leipzig (DE); Sabine Knolle, Bertrange (LU); Uwe Kriltz, Jena (DE)

(73) Assignee: GUARDIAN EUROPE S.A.R.L., Bertrange (LU)

( * ) Notice: Subject to any disclaimer, the term of this patent is extended or adjusted under 35 U.S.C. 154(b) by 0 days.

(21) Appl. No.: 15/651,479

(22) Filed: Jul. 17, 2017

(65) Prior Publication Data

US 2019/0016631 A1    Jan. 17, 2019

(51) Int. Cl.
| | | |
|---|---|---|
| *C03C 17/09* | (2006.01) | |
| *B05D 3/00* | (2006.01) | |
| *C09D 5/00* | (2006.01) | |
| *C03C 17/36* | (2006.01) | |
| *C09K 13/00* | (2006.01) | |

(52) U.S. Cl.
CPC .............. *C03C 17/09* (2013.01); *B05D 3/007* (2013.01); *C03C 17/36* (2013.01); *C09D 5/006* (2013.01); *C03C 2217/256* (2013.01); *C03C 2218/156* (2013.01); *C03C 2218/328* (2013.01); *C03C 2218/34* (2013.01); *C09K 13/00* (2013.01)

(58) Field of Classification Search
CPC .............. C03C 17/09; C03C 2218/156; C03C 2217/256; B05D 3/007; C09D 5/006; C09K 13/00
See application file for complete search history.

(56) References Cited

U.S. PATENT DOCUMENTS

| | | | |
|---|---|---|---|
| 4,716,686 A | 1/1988 | Lisec | |
| 4,808,329 A * | 2/1989 | Soldanski | C11D 3/1233 510/180 |
| 4,851,095 A | 7/1989 | Scobey et al. | |
| 4,919,778 A | 4/1990 | Dietrich et al. | |
| 4,941,929 A | 7/1990 | Tecle | |

(Continued)

FOREIGN PATENT DOCUMENTS

| | | |
|---|---|---|
| EP | 0 010 971 | 5/1980 |
| EP | 1 046 727 | 10/2000 |

(Continued)

OTHER PUBLICATIONS

"Tensile Stress" from the Simple English Wikipedia, retrieved Jul. 17, 2017, 1 page.
Ferro Technical Data Sheet, retrieved Jul. 17, 2017, 1 page.

*Primary Examiner* — Anita K Alanko (57) ABSTRACT

Certain example embodiments relate to heating a ceramic paint applied to a portion of a coated article in order to at least partially "eat through" the underlying coating, with any remaining materials being removable by washing, and associated articles. In certain example embodiments, the coatings are multilayer sputter-deposited coatings formed on a glass or other substrate. The heat may be provided in connection with conventional heat treatment (e.g., thermal tempering) and/or heat bending processes that otherwise would be performed on the coated article.

9 Claims, 6 Drawing Sheets

(56) References Cited

U.S. PATENT DOCUMENTS

| | | | |
|---|---|---|---|
| 4,995,895 A | 2/1991 | Groth et al. |
| 5,015,353 A | 5/1991 | Hubler et al. |
| 5,080,455 A | 1/1992 | King et al. |
| 5,279,722 A | 1/1994 | Szczyrbowski et al. |
| 5,425,861 A | 6/1995 | Hartig et al. |
| 5,443,862 A | 8/1995 | Buffat et al. |
| 5,514,476 A | 5/1996 | Hartig et al. |
| 5,569,362 A | 10/1996 | Lerbet et al. |
| 5,713,986 A | 2/1998 | Franz et al. |
| 5,934,982 A | 8/1999 | Vianello et al. |
| 6,033,471 A | 3/2000 | Nakanishi et al. |
| 6,077,621 A | 6/2000 | Allen et al. |
| 6,261,693 B1 | 7/2001 | Veerasamy |
| 6,359,388 B1 | 3/2002 | Petrmichl |
| 6,382,816 B1 | 5/2002 | Zhao et al. |
| 6,395,333 B2 | 5/2002 | Veerasamy |
| 6,425,987 B1 | 7/2002 | Lee et al. |
| 6,447,891 B1 | 9/2002 | Veerasamy et al. |
| 6,451,434 B1 | 9/2002 | Ebisawa et al. |
| 6,461,731 B1 | 10/2002 | Veerasamy et al. |
| 6,495,251 B1 | 12/2002 | Arbab et al. |
| 6,576,349 B2 | 6/2003 | Lingle et al. |
| 6,589,658 B1 | 7/2003 | Stachowiak |
| 6,592,992 B2 | 7/2003 | Veerasamy |
| 6,592,993 B2 | 7/2003 | Veerasamy |
| 6,596,399 B2 | 7/2003 | Veerasamy |
| 6,602,371 B2 | 8/2003 | Veerasamy |
| 6,623,846 B2 | 9/2003 | Laird |
| 6,627,317 B2 | 9/2003 | Wang |
| 6,632,491 B1 | 10/2003 | Thomsen et al. |
| 6,660,340 B1 | 12/2003 | Kirkpatrick |
| 6,663,753 B2 | 12/2003 | Veerasamy et al. |
| 6,665,033 B2 | 12/2003 | Callegari et al. |
| 6,667,121 B2 | 12/2003 | Wang |
| 6,689,476 B2 | 2/2004 | Veerasamy et al. |
| 6,706,363 B2 | 3/2004 | Honda et al. |
| 6,713,178 B2 | 3/2004 | Veerasamy |
| 6,723,211 B2 | 4/2004 | Lingle et al. |
| 6,971,948 B2 | 12/2005 | Valek et al. |
| 6,988,938 B2 | 1/2006 | Valek et al. |
| 7,125,462 B2 | 10/2006 | Distelorf |
| 7,140,953 B1 | 11/2006 | Raynauld |
| 7,229,533 B2 | 6/2007 | Veerasamy |
| 7,641,978 B2 | 1/2010 | Veerasamy |
| 8,197,941 B2 | 6/2012 | Veerasamy |
| 8,435,371 B2* | 5/2013 | Schmatloch | C09J 101/02 |
| | | | 156/107 |
| 8,449,348 B2 | 5/2013 | Sondag |
| 8,664,570 B2 | 3/2014 | Odeh |
| 8,668,798 B2 | 3/2014 | Cooper et al. |
| 2002/0064662 A1 | 5/2002 | Lingle et al. |
| 2002/0146570 A1 | 10/2002 | Choi et al. |
| 2003/0049464 A1 | 3/2003 | Glenn et al. |
| 2003/0150711 A1 | 8/2003 | Laird |
| 2003/0194567 A1 | 10/2003 | Lingle et al. |
| 2003/0194570 A1 | 10/2003 | Lingle et al. |
| 2003/0232197 A1 | 12/2003 | Distelorf |
| 2003/0235719 A1 | 12/2003 | Grimal et al. |
| 2004/0067362 A1 | 4/2004 | Veerasamy et al. |
| 2004/0067363 A1 | 4/2004 | Bienkiewicz et al. |
| 2006/0008655 A1 | 1/2006 | Butz et al. |
| 2006/0008657 A1 | 1/2006 | Kriltz et al. |
| 2010/0330309 A1 | 12/2010 | Cooper |
| 2011/0233481 A1* | 9/2011 | Alvarez | B23K 35/3006 |
| | | | 252/514 |
| 2012/0219821 A1* | 8/2012 | Frank | C03C 17/36 |
| | | | 428/630 |
| 2015/0376935 A1* | 12/2015 | Greiner | E06B 3/66304 |
| | | | 428/34 |
| 2017/0267580 A1* | 9/2017 | Lingle | C03C 17/3626 |

FOREIGN PATENT DOCUMENTS

| | | |
|---|---|---|
| GB | 2 126 256 | 3/1984 |
| WO | 97/38850 | 10/1997 |
| WO | 2006/012184 | 2/2006 |
| WO | WO 2014/133929 | 9/2014 |

\* cited by examiner

COATED ARTICLE HAVING CERAMIC PAINT MODIFIED SURFACE(S), AND/OR ASSOCIATED METHODS

TECHNICAL FIELD

Certain example embodiments of this invention relate to coated articles having one or more ceramic paint modified surfaces, and/or associated methods. More particularly, certain example embodiments of this invention relate to heating a ceramic paint applied to a portion of a coated article in order to at least partially "eat through" the underlying coating, with any remaining materials being removable by washing, and associated articles.

BACKGROUND AND SUMMARY

A coated article includes a single layer or multilayer coating supported by a substrate. Glass substrates oftentimes will be used in connection with coated articles, and oftentimes coatings will be thin film coatings formed by magnetron sputtering or the like.

Coated articles such as these may be used for a variety of applications including, for example, in low-emissivity (low-E) windows, reflective products (e.g., commercial or residential mirrors, solar reflectors, etc.), electronic applications (e.g., for radar, HF, or other dampening or transmitting applications; in flat panel displays, etc.), and/or the like. Antireflective (AR) coatings, bird protection coatings, UV light blocking coatings, and/or the like may be used with, integrated into, or used separately compared to these products.

To meet these and/or other needs, the coated articles may be used "on their own" (e.g., in monolithic products), laminated products (e.g., where two sheets of glass are bonded together using a polymer-based or other interlayer such as, for example, PVB, EVA, PET, PU, etc.), built into insulating glass units (IG units or IGUs) or vacuum insulating glass (VIG) units, used in structural glazings, and/or the like.

Oftentimes, it will be necessary or desirable to remove at least a portion of a coating. For example, it oftentimes is desirable to "edge delete" certain coatings. Edge deletion generally involves removing a portion of the coating around peripheral edges of the underlying substrate. Edge deletion can be helpful, for example, in reducing the likelihood of a coating deteriorating, as corrosion and damaging water ingress usually begin at unsealed peripheral edges, etc. In these and/or other applications, removal of a coating may be helpful in providing a more structurally secure surface for a material to bond to, e.g., in that a guide rail, handle, or other piece of hardware may form a more robust connection with bare glass as compared to an upper surface of a coating, etc. Similarly, in these and/or other applications, removal of a coating may be helpful in providing electrical isolation, etc.

Edge deletion tables are known. See, for example, U.S. Pat. Nos. 4,716,686; 5,713,986; 5,934,982; 6,971,948; 6,988,938; 7,125,462; 7,140,953; and 8,449,348, each of which is hereby incorporated herein in its entirety. In general, in such tables, a series of casters provided to the table allow for smooth movement of glass across the surface of the table. Grinding wheels of various widths may be used in connection with shields to help reduce the scattering of debris and for safety purposes. Passing the glass substantially consistently under the deletion head efficiently "deletes" the coating from the glass so that it can be used, for example, in connection with the above-described and/or other articles. Wider or narrower grinding wheels may be used to delete more or less coating from the glass surface.

Although edge deletion tables can be used in a variety of applications, they unfortunately have their limitations. For example, edge deletion tables oftentimes are large and require additional machinery in a process line. The addition of process steps can increase delivery time and costs. Edge deletion tables, by their nature, can also create debris that needs to be dealt with accordingly.

Moreover, although edge deletion tables oftentimes are suitable for edge deletion, as their name implies, they oftentimes are limited in the ability to remove coatings in interior areas. This can become increasingly problematic as the area(s) to be removed become smaller and smaller, as there is a practical limit to the size reductions possible for grinding wheels and the like. Conventional edge deletion tables oftentimes are unsuitable for a variety of electronics applications, e.g., where thin lines of demarcation between electrically conductive areas are needed.

Silver pastes are commonly used to form electrical connections with metal conductive layers. See, for example, U.S. Publication No. 2010/0330309 and U.S. Pat. Nos. 4,941,929; 8,664,570; and 8,668,798, which references describe example silver frits/pastes and are hereby incorporated by reference herein in their entireties. The silver paste typically is made to penetrate the top layer (or layers) of oxidized or ceramic films so as to come into contact with a metallic conductive layer(s).

Unfortunately, however, silver pastes are not always able to penetrate the topmost layer (or layers) of all thin film coatings to reach the metallic conductive layer(s), particularly in cases where the layer (or layers) provided over the metallic conductive layer(s) are very strong dielectrics. For instance, when the design of the coating stack includes top layers of transitional elements or compounds including, for example, Zirconium, Scandium, Titanium, Vanadium, Yttrium, Niobium, Lanthanum, Hafnium, and/or Tantalum, highly dielectric films with high surface strengths may be created. Standard silver pastes commercially used in the market today often will not penetrate these highly dielectric films and thus will not create an electrical contact to the metal current-transmitting layers within the coating stack design. Furthermore, in applications where it is desirable to eat all the way through the coating, many conventional silver pastes will be insufficient, as they may not even reach through top dielectric material(s). Improvements have been made in connection with forming electrical connections when thick dielectric materials have been made (see, for example, U.S. Pat. No. 9,085,051, the entire contents of which are hereby incorporated herein by reference), but such improvements are designed to facilitate electrical connections as opposed to completely dissolving a coating. Silver and/or other pastes also may be impractical for large area deletions.

Certain example embodiments address these and/or other concerns. For example, certain example embodiments relate to heating a ceramic paint applied to a portion of a coated article in order to at least partially "eat through" the underlying coating, with any remaining materials being removable by washing, and associated articles. Such techniques may be used in place of, or together with, mechanical edge deletion, patterning, laser scribing, ion beam milling, and/or other techniques.

In certain example embodiments, a method of making a coated article including a sputter-deposited coating supported by a glass substrate is provided. A coating-dissolving material is applied over and contacting the sputter-deposited coating in one or more areas in which the sputter-deposited coating is to be removed. The glass substrate with the coating-dissolving material applied over and contacting the sputter-deposited coating is heated at a temperature of 500-700 degrees C. for no more than 10 minutes. The heating causes the sputter-deposited coating under the coating-dissolving material to be at least partially damaged in the one or more areas in which the sputter-deposited coating is to be removed but does not cause undesired damage to the sputter-deposited coating in other areas. Following the heating, the glass substrate is washed to remove excess material(s) from the glass substrate in the one or more areas in which the sputter-deposited coating is to be removed, in making the coated article. The coating comprises a plurality of dielectric layers.

In certain example embodiments, a method of making a coated article including a sputter-deposited coating supported by a glass substrate is provided. The glass substrate with a coating-dissolving material applied over and contacting the sputter-deposited coating in one or more areas in which the sputter-deposited coating is to be removed is heated, with the heating at least partially dissolving the sputter-deposited coating in the one or more areas in which the sputter-deposited coating is to be removed but elsewhere not dissolving the sputter-deposited coating, and with the heating being performed in connection with heat treatment and/or heat bending of the glass substrate. Following the heating, the glass substrate is washed to remove excess material(s) from the glass substrate in the one or more areas in which the sputter-deposited coating is to be removed, in making the coated article.

In certain example embodiments, an intermediate coated article comprises a glass substrate; a sputter-deposited coating supported by the glass substrate; and a coating-dissolving material applied over and contacting the sputter-deposited coating in one or more areas in which the sputter-deposited coating is to be removed, the coating-dissolving material having a composition selected so as to be heatable at temperatures used in heat treatment and/or heat bending of the glass substrate to cause the sputter-deposited coating to dissolve in the one or more areas in which the sputter-deposited coating is to be removed and to thereafter be removable by washing.

According to certain example embodiments, the coating-dissolving material may be a ceramic paint that, after heating, is removable by washing with water; and the sputter-deposited coating may be a functional (e.g., low-E, AR, conductive, UV-blocking, reflective, solar control, etc.) coating comprising multiple thin film layers.

The features, aspects, advantages, and example embodiments described herein may be combined to realize yet further embodiments.

BRIEF DESCRIPTION OF THE DRAWINGS

These and other features and advantages may be better and more completely understood by reference to the following detailed description of exemplary illustrative embodiments in conjunction with the drawings, of which.

DETAILED DESCRIPTION

Certain example embodiments relate to improved techniques for selectively removing a portion or portions of a coating supported by a substrate. The coating may in some instances be a sputter-deposited coating comprising one or more thin film layers, and the substrate may in some instances be a glass substrate. Once the film is removed from the desired area(s), the resulting coated article can be used in a variety of architectural, technical/electrical, automotive, and/or other applications. For instance, the example techniques may be used in connection with insulating glass units (IGUs or IG units), e.g., where it would be desirable to provide a "clean" edge for a peripheral spacer; vacuum insulating glass (VIG) units, e.g., where it would be desirable to provide a "clean" edge for a frit bonding the units together; structural glazing units, e.g., where it would be desirable to provide a "clean" edge for a frame or other mounting feature(s); decorative designs; bird protection units, e.g., where it would be desirable to imprint a pattern for a bird to see; for electrical segmentation (e.g., for radar dampening, HF radiation dampening and/or transmitting), e.g., to create electrically isolating areas; in automotive or related applications, e.g., where it would be desirable to provide rails, latches, and the like, e.g., for sliding windows (e.g., for trucks, tractors, and the like, as well as for toll booths and other applications); etc.

Figure 1:
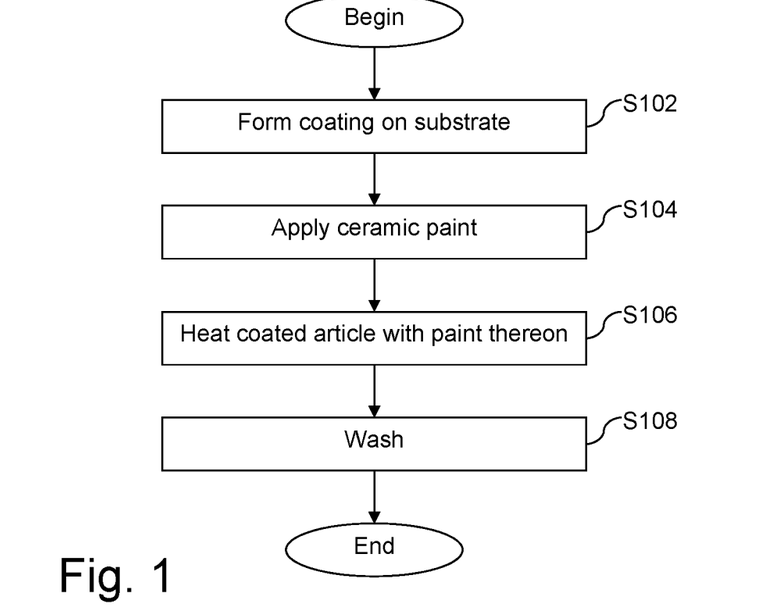
FIG. 1 is a flowchart showing an example process for removing portions of a coating using a ceramic paint, in accordance with an example embodiments.

FIG. 1 is a flowchart showing an example process for removing portions of a coating using a ceramic paint, in accordance with an example embodiments. As will be appreciated from FIG. 1, certain example embodiments relate to a method of making a coated article including a sputter-deposited coating supported by a glass substrate, and/or a corresponding coated article. In step S102, the coating is formed on the substrate. The coating in this instance may include a plurality of dielectric and/or other layers. In some instances, the coating may include a layer comprising ITO, and it may lack any layers comprising ITO in other instances. In step S104, a coating-dissolving material is applied over and contacting the sputter-deposited coating in one or more areas in which the sputter-deposited coating is to be removed.

The coating-dissolving material may be a paint, e.g., a ceramic paint, in certain example embodiments. Ferro's TDF9283AAL product is a lead free flux paste for dissolution of conductive ITO-based coatings on glass during firing. The firing layer is removed with water. The flux system in this product comprises $P_2O_5$—$Na_2O$. Ferro's product is envisioned as being used as a paste, mixed from a powder, useful in removing ITO and ITO-inclusive coatings after firing at 690-710 degrees C. for 3 minutes. By contrast, certain example embodiments render this material as a paint and use it to remove different types of coatings at lower temperatures. For example, by rendering the material as a paint and applying it to a multilayer sputter-deposited thin film coating, certain example embodiments are able to remove the underlying coating at a temperature range that is typically used in heat treatment (e.g., thermal tempering) and/or heat bending of glass. The application of paint can be performed automatically, e.g., with programmably-controllable robots. Advantageously, the need for an edge deletion table and/or other removal apparatus can be removed, as the paint can be activated to remove the underlying areas through apparatuses that are already likely to form part of a commercial line. The operating temperatures are compatible with existing processes, which is further advantageous in terms of ease of integration into an already functional line. Furthermore, the ceramic paint can "eat through" thick dielectric layers, through functional layers, through additional thick dielectric layers, etc., completely removing coatings of many different kinds (including, for example, low-E, AR, conductive, UV-blocking, reflective, solar control, etc.). Thus, instead of merely exposing certain layers for electrical contact and/or isolation, certain example embodiments destroy coatings and enable resulting debris to be simply washed off so that the surface of the substrate is exposed.

Referring once again to FIG. 1, step S106 involves heating the glass substrate with the coating-dissolving material applied over and contacting the sputter-deposited coating at a temperature of 500-700 degrees C. (more preferably 500-680 degrees C., still more preferably 580-650 degrees C. for thermal tempering) for no more than 10 minutes. The heating causes the sputter-deposited coating under the coating-dissolving material to be at least partially damaged in the one or more areas in which the sputter-deposited coating is to be removed, but the heating does not cause undesired damage to the sputter-deposited coating in other areas. Following the heating, in step S108, the glass substrate is washed (e.g., using DI water and/or the like) to remove excess material(s) from the glass substrate in the one or more areas in which the sputter-deposited coating is to be removed, in making the coated article.

Figure 2:
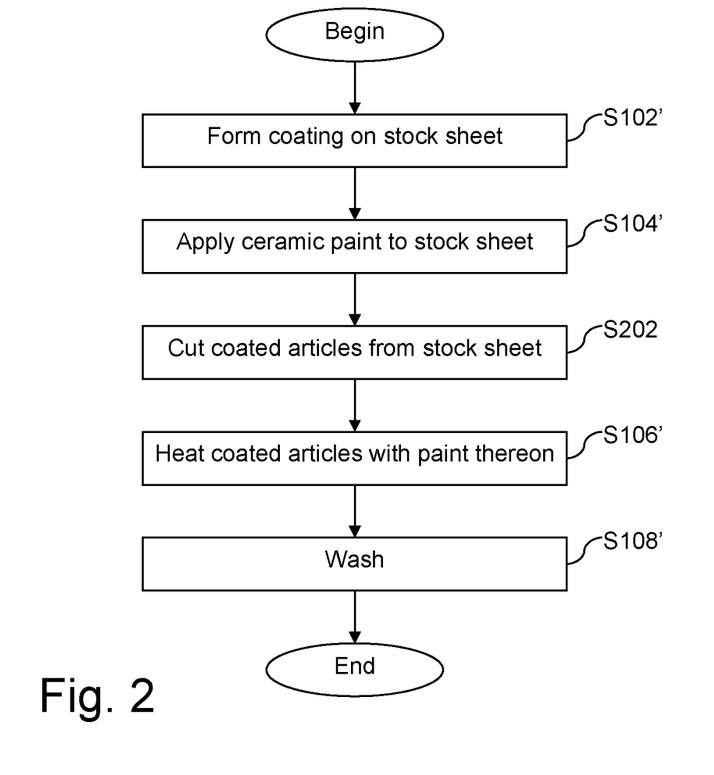
FIG. 2 is a flowchart showing another example process for removing portions of a coating using a ceramic paint, in accordance with an example embodiments.

It will be appreciated that the example techniques disclosed herein may be scaled up so as to work with stock sheets from which intermediate coated articles can be produced. In that regard, FIG. 2 is a flowchart showing another example process for removing portions of a coating using a ceramic paint, in accordance with an example embodiments. The FIG. 2 flowchart is similar to the FIG. 1 flowchart. For example, in step S102', a coating is formed on the large stock sheet, e.g., via sputtering or the like. In step S104', the ceramic paint is applied to the stock sheet in areas where the coating is to be removed. Coated articles, or intermediate coated articles that may be further processed, are cut in step S202, e.g., with the paint thereon. Then, the coated articles can be heated, e.g., in connection with a heat treatment and/or bending process, in step S106', in order to damage and substantially remove the underlying coating. In step S108', the coated articles are washed to remove residual debris and/or the like.

It will be appreciated from the above that the example techniques described herein may be used in connection with a variety of coatings and coating types. Several example coatings are shown in, and described in connection with, FIGS. 3-6. However, it will be appreciated that these example coatings, and these example coating types, are provided by way of example and without limitation, unless expressly claimed.

Figure 3:
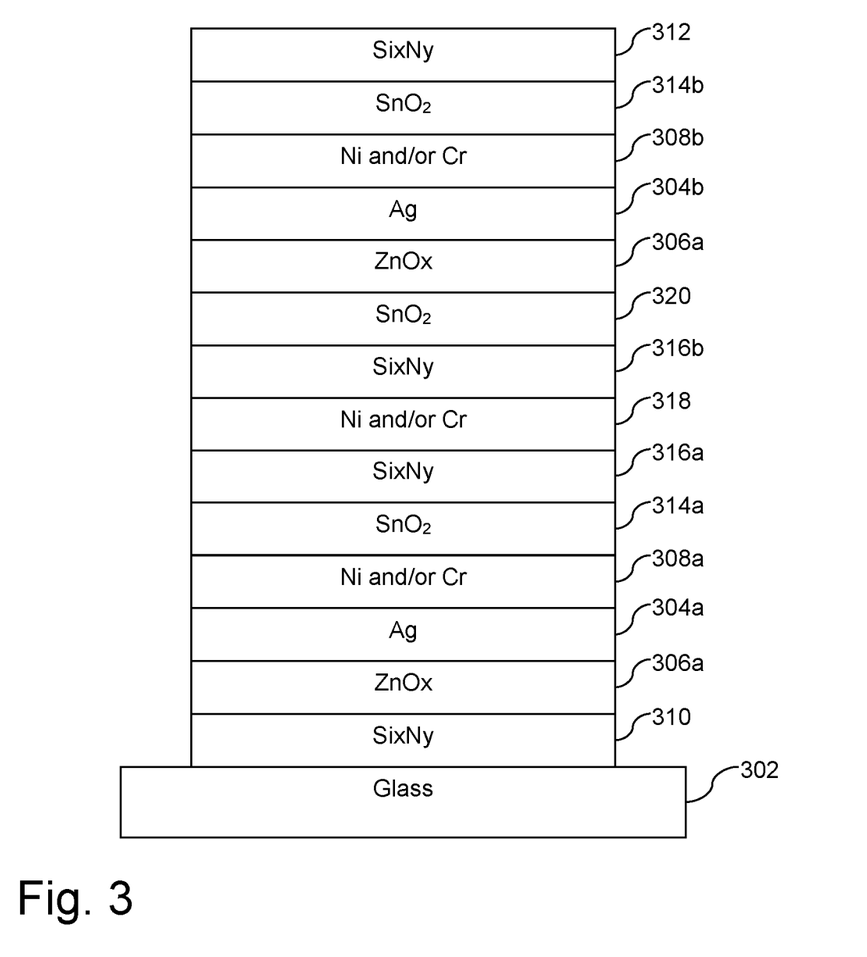
FIG. 3 is a schematic, cross-sectional view of a coated article including an example low-emissivity (low-E) coating that can be at least partially removed using the techniques of certain example embodiments.

FIG. 3 is a schematic, cross-sectional view of a coated article including an example low-emissivity (low-E) coating that can be at least partially removed using the techniques of certain example embodiments. The FIG. 3 substrate 302 supports first and second layers comprising silver 304a and 304b. Directly under and contacting the first and second layers comprising silver 304a and 304b are first and second layers comprising zinc oxide (which may also include aluminum) 306a and 306b, which may help promote good Ag growth thereon, and directly over and contacting the first and second layers comprising silver 304a and 304b are layers 308a and 308b comprising Ni, Cr, and/or Ti, which may be oxided in certain example embodiments. A silicon inclusive layer 310 (e.g., a layer comprising silicon oxide, silicon nitride, and/or silicon oxinitride) is provided on the glass 302 and may serve as a sodium blocking layer and/or assist with optics of the stack as a whole. Another silicon inclusive layer 312 may be provided as an uppermost layer in the stack and may help protect the underlying layers, e.g., from mechanical wear, during heat treatment, etc. First and second layers comprising tin oxide 314a and 314b may be provided over the first and second layers 308a and 308b, e.g., to serve as caps of breakers. Another layer comprising silicon may in essence be split into two layers 316a and 316b and separated by another layer 318 comprising Ni, Cr, and/or Ti, which may be oxided, which may further protect the lower layer stack. Another layer comprising tin oxide 320 may be provided between the split layer comprising silicon. It will be appreciated that some or all of the layers comprising zinc oxide may also include aluminum and/or tin, etc. Example layer materials and thicknesses for the FIG. 3 example coated article are provided in the table below:

| Layer | Preferred Thickness (nm) | More Preferred Thickness (nm) | Example Thickness (nm) |
| --- | --- | --- | --- |
| $Si_3N_4$ (312) | 165-255 | 190-230 | 210 |
| $SnO_2$ (314b) | 115-175 | 130-160 | 145 |
| NiCrOx (308b) | 20-30 | 22-28 | 25 |
| Ag (304b) | 120-185 | 135-1670 | 155 |
| ZnAlOx (306a) | 80-120 | 90-110 | 100 |
| $SnO_2$ (320) | 50-80 | 60-75 | 65 |
| Si3N4 (316b) | 95-145 | 105-135 | 120 |
| NiCrOx (318) | 8-14 | 9-12 | 10 |
| $Si_3N_4$ (316a) | 95-145 | 108-132 | 120 |
| $SnO_2$ (314) | 390-590 | 440-545 | 490 |
| NiCrOx (308a) | 20-30 | 22-28 | 25 |
| Ag (304a) | 60-90 | 67-85 | 75 |
| ZnAlOx (306a) | 80-120 | 90-110 | 100 |

| Layer | Preferred Thickness (nm) | More Preferred Thickness (nm) | Example Thickness (nm) |
|---|---|---|---|
| $Si_3N_4$ (310) | 170-255 | 190-235 | 215 |
| GLASS (302) | N/A | N/A | N/A |

Figure 4:
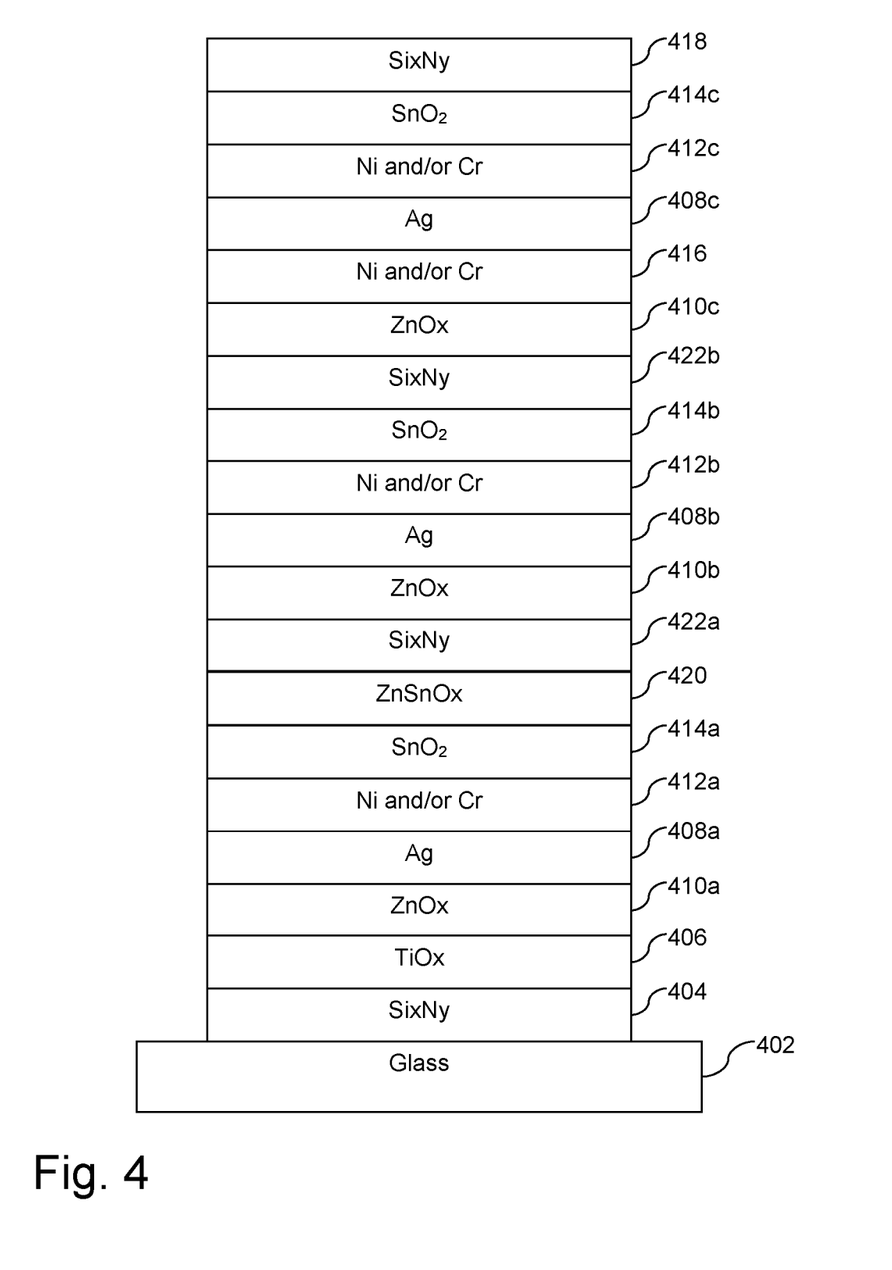
FIG. 4 is a schematic, cross-sectional view of a coated article including another example low-E coating that can be at least partially removed using the techniques of certain example embodiments.

FIG. 4 is a schematic, cross-sectional view of a coated article including another example low-E coating that can be at least partially removed using the techniques of certain example embodiments. The substrate 402 supports a first silicon-inclusive layer 404 and a layer comprising titanium oxide 406, which together help provide for desirable optics in the overall stack. The coating includes first, second, and third layers comprising Ag 408a, 408b, and 408c. Each layer comprising Ag has below it, either in direct or near-direct contact therewith, a layer comprising zinc oxide 410a 410b, and 410c, respectively. The layers comprising zinc oxide 410a 410b, and 410c may include Al and/or Sn in certain example embodiments. Over and contacting the Ag layers are layers 412a-412c comprising Ni, Cr, and/or Ti, which may be oxided in certain example embodiments, and over each of these layers 412a-412c is a layer comprising tin oxide 414a-414c. A thin layer comprising Ni, Cr, and/or Ti 416 may be provided under the topmost layer comprising Ag 408c, e.g., to aid in heat treatability of the overall coating. An uppermost silicon-inclusive layer 418 may be provided to help protect the coating. A layer comprising zinc stanate 420 may be provided between the lower and middle layers comprising Ag 408a and 408b, e.g., as a breaker layer. Additional layers comprising Si 422a-422b may be provided to help protect the underlying layers during subsequent processing, to provide desired optical properties, and/or the like. Example layer materials and thicknesses for the FIG. 4 example coated article are provided in the table below:

| Layer | Preferred Thickness (nm) | More Preferred Thickness (nm) | Example Thickness (nm) |
|---|---|---|---|
| $Si_3N_4$ (418) | 120-180 | 135-165 | 150 |
| $SnO_2$ (414c) | 110-170 | 125-155 | 140 |
| NiCrOx (412c) | 20-40 | 25-35 | 30 |
| Ag (408c) | 85-135 | 95-125 | 110 |
| NiCrOx (416) | 0.2-1.7 | 0.5-1.5 | 1 |
| ZnAlOx (410c) | 175-265 | 195-245 | 220 |
| $Si_3N_4$ (422b) | 100-160 | 115-145 | 130 |
| $SnO_2$ (414b) | 195-295 | 220-275 | 245 |
| NiCrOx (412b) | 30-50 | 30-45 | 40 |
| Ag (408b) | 80-125 | 90-115 | 100 |
| ZnAlOx (410b) | 160-250 | 180-230 | 205 |
| $Si_3N_4$ (422a) | 110-170 | 125-155 | 140 |
| ZnSnOx (420) | 160-240 | 180-220 | 200 |
| $SnO_2$ (414a) | 180-280 | 205-255 | 230 |
| NiCrOx (412a) | 25-40 | 25-40 | 35 |
| Ag (408a) | 80-130 | 90-120 | 105 |
| ZnAlOx (410a) | 80-125 | 90-115 | 105 |
| $TiO_2$ (406) | 20-40 | 25-35 | 30 |
| $Si_3N_4$ (404) | 60-100 | 70-90 | 80 |
| GLASS (402) | N/A | N/A | N/A |

As will be appreciated from the FIG. 3 and FIG. 4 examples, low-E coatings comprising one, two, three, or more functional Ag and/or other layers may be provided and eaten through using the techniques of certain example embodiments.

Figure 5:
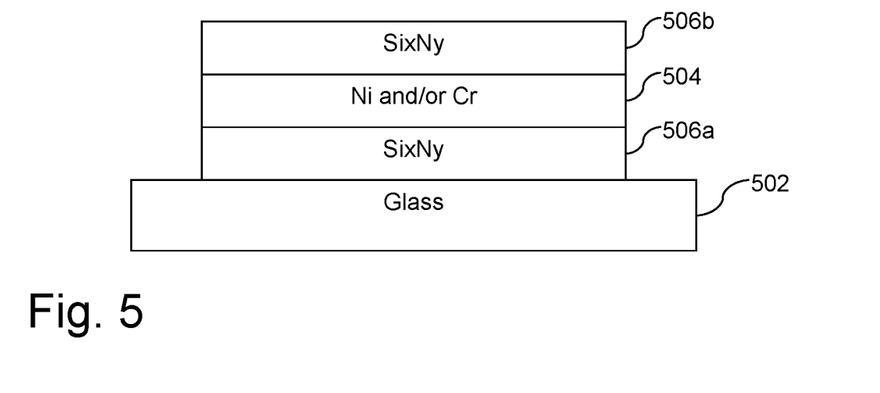
FIG. 5 is a schematic, cross-sectional view of a coated article including an example highly-reflective solar control coating that can be at least partially removed using the techniques of certain example embodiments.

FIG. 5 is a schematic, cross-sectional view of a coated article including an example highly-reflective solar control coating that can be at least partially removed using the techniques of certain example embodiments. In FIG. 5, the substrate 502 supports a layer 504 comprising Ni, Cr, Ti, and/or combinations thereof. In certain example embodiments, this layer 504 may be oxided and/or nitrided in certain example embodiments and it may be sandwiched between first and second silicon-inclusive layers 506a and 506b (which may include silicon oxide, silicon nitride, silicon oxynitride, and/or the like). In the FIG. 5 example, the first and second silicon-inclusive layers 506a and 506b comprising silicon nitride (e.g., $Si_3N_4$ or other suitable stoichiometry). Example layer materials and thicknesses for the FIG. 5 example coated article are provided in the table below:

| Layer | Preferred Thickness (nm) | More Preferred Thickness (nm) | Example Thickness (nm) |
|---|---|---|---|
| $Si_3N_4$ (506b) | 220-340 | 250-310 | 280 |
| NiCr(Nx) (504) | 260-400 | 295-365 | 330 |
| $Si_3N_4$ (506a) | 70-110 | 80-100 | 90 |
| GLASS (502) | N/A | N/A | N/A |

In certain example embodiments a layer comprising zirconium (e.g., $ZrO_2$ or other suitable stoichiometry) may be provided as a top-most layer, e.g., for enhanced durability. This layer may be 20-100 nm thick in some instances.

Figure 6:
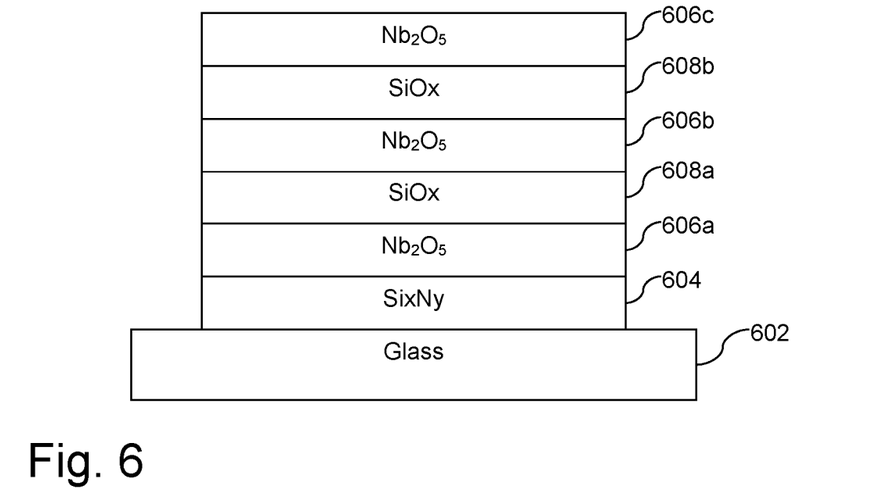
FIG. 6 is a schematic, cross-sectional view of a coated article including an example highly-reflective dielectric mirror coating that can be at least partially removed using the techniques of certain example embodiments.

FIG. 6 is a schematic, cross-sectional view of a coated article including an example highly-reflective dielectric mirror coating that can be at least partially removed using the techniques of certain example embodiments. As shown in FIG. 6, the substrate 602 supports a plurality of layers that alternate between a silicon-inclusive material and a niobium-inclusive material, e.g., in order moving away from the substrate 602 and ending with a niobium-inclusive layer. More particularly, the glass substrate 602 supports a silicon-inclusive layer 604, which may help reduce the incidence of sodium migration from the glass substrate 602, a first niobium-inclusive layer 606a, a first silicon-inclusive alternating layer 608a, a second niobium-inclusive layer 606b, a second silicon-inclusive alternating layer 608b, and a third niobium-inclusive layer 606c. In certain example embodiments, each of the silicon-inclusive layers 604 and 608a-608b may comprise or consist of the same material (e.g., silicon oxide, silicon nitride, silicon oxynitride, and/or the like). In certain example embodiments, the silicon-inclusive alternating layer 608a-608b may comprise or consist of the same material that is different from the silicon-inclusive layer 604. For instance, the silicon-inclusive alternating layers 608a-608b may comprise silicon oxide (e.g., $SiO_2$ or other suitable stoichiometry) whereas the silicon-inclusive layer 604 may comprise silicon nitride (e.g., $Si_3N_4$ or other suitable stoichiometry). In certain example embodiments, each niobium-inclusive layer may alternatively or additionally include zirconium, and/or an oxide of niobium and/or zirconium. Example layer materials and thicknesses for the FIG. 6 example coated article are provided in the table below:

| Layer | Preferred Thickness (nm) | More Preferred Thickness (nm) | Example Thickness (nm) |
|---|---|---|---|
| $Nb_2O_5$ (606c) | 640-960 | 720-885 | 800 |
| $SiO_2$ (608b) | 390-580 | 440-540 | 490 |
| $Nb_2O_5$ (606b) | 480-720 | 540-665 | 600 |
| $SiO_2$ (608a) | 230-345 | 255-320 | 290 |
| $Nb_2O_5$ (606a) | 65-100 | 75-95 | 85 |
| $Si_3N_4$ (604) | 160-240 | 180-220 | 200 |
| GLASS (602) | N/A | N/A | N/A |

Similar to the discussion of example coatings and coating types above, it will be appreciated that the example techniques described herein may be used in connection with a variety of applications and products/application and product types. Several example products are shown in, and described in connection with, FIGS. 7-11. However, it will be appreciated that these example applications and products, and these example application and product types, are provided by way of example and without limitation, unless expressly claimed.

Figure 7:
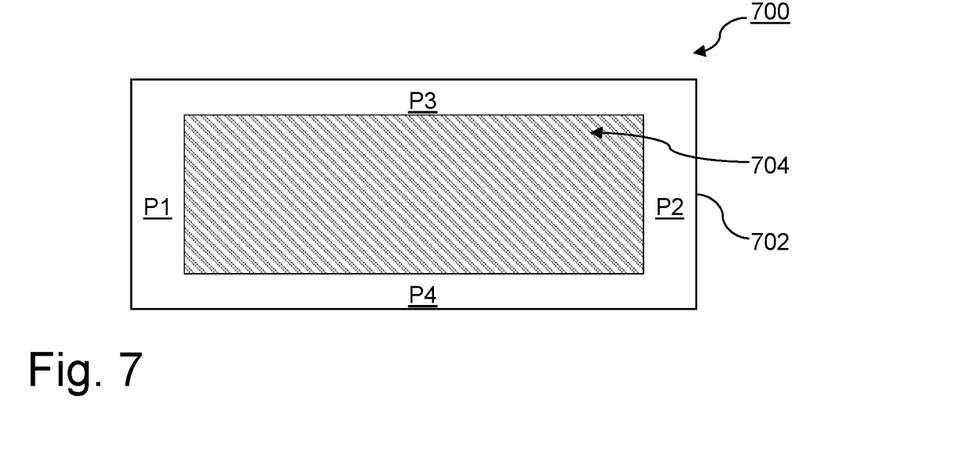
FIG. 7 is a top plan view of a coated article having peripheral edges of the coating thereof removed using the techniques of certain example embodiments.

FIG. 7 is a top plan view of a coated article 700 having peripheral edges P1, P2, P3, and P4 of the coating 704 that is supported by the substrate 702 removed using the techniques of certain example embodiments. As shown in the FIG. 7 example, the left and right peripheral edges P1 and P2 have approximately the same material removed so as to expose a top surface of the substrate 702, and the top and bottom peripheral edges P3 an P4 have approximately the same material removed, but the amount of material removed from the left and right peripheral edges P1 and P2 differs from the amount of material removed from the top and bottom peripheral edges P3 an P4. Thus, as will be appreciated from FIG. 7, the area of the coating 704 removed from the peripheral edges P1, P2, P3, and P4 may be the same or different. In this regard, the area can be controlled simply by applying more or less paint to the areas, e.g., in the desired shape and arrangement relative to what is desired for exposure on the uppermost surface of the substrate 702.

Figure 8:
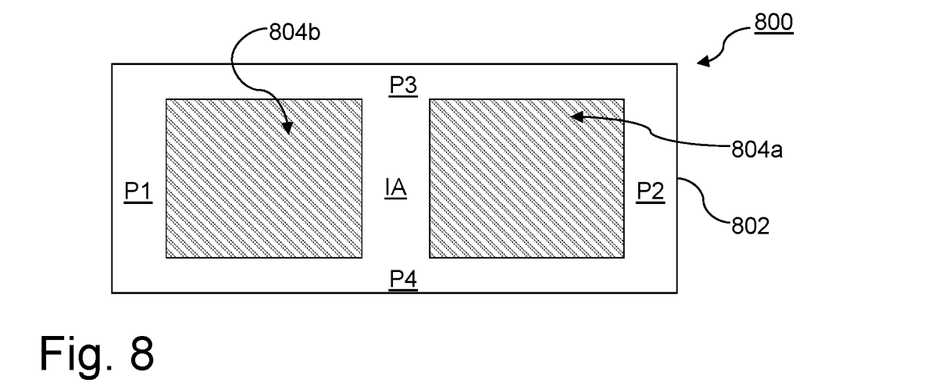
FIG. 8 is a top plan view of a coated article having areas of the coating thereof removed in order to create electrically isolated areas, in accordance with certain example embodiments.

FIG. 8 is similar to FIG. 7, in that FIG. 8 is a top plan view of a coated article 800 having areas of the coating thereof removed in order to create electrically isolated areas, in accordance with certain example embodiments. In this example, the coating is conductive and may, for example, be used in an antenna, vending machine, touch panel, or other application. The coating is removed at peripheral edges P1, P2, P3, and P4, which may be useful for accommodating a frame around the substrate 802. In addition, an electrically isolating area IA is formed approximately in the center of the substrate 802, thereby creating first and second conductive coated areas 804a and 804b. The electrically isolating area IA may be formed anywhere that is desirable for the end product and need not be formed in the center or approximate center of the substrate 802. Similarly, more electrically isolating areas may be formed in different example embodiments, e.g., by painting the areas in the desired configurations prior to heating. This may be useful in creating multiple touch zones, etc.

Figure 9:
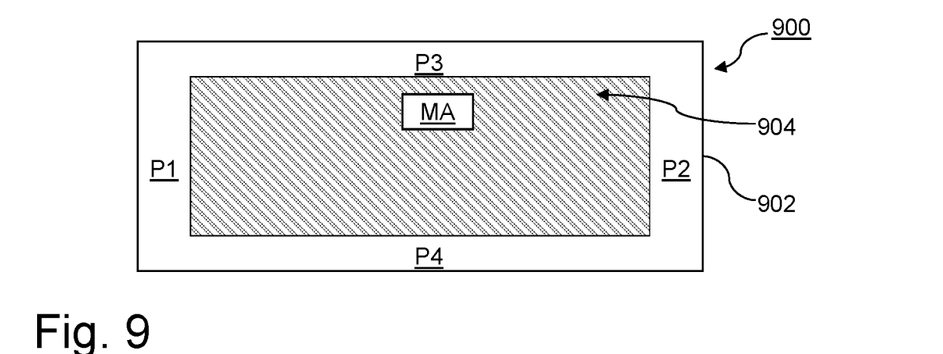
FIG. 9 is a top plan view of a coated article having areas of the coating thereof removed in order to support the mounting of features thereon, in accordance with certain example embodiments.

FIG. 9 is a top plan view of a coated article 900 having areas of the coating thereof removed in order to support the mounting of features thereon, in accordance with certain example embodiments. FIG. 9 also is similar to FIG. 7, in that it shows a substrate 902 with a coating 904 thereon being removed around peripheral edges P1, P2, P3, and P4. The FIG. 9 example may be used in connection with an automotive application, e.g., where it might be desirable to mount a structure on the substrate 902 in an area that otherwise would be covered by the coating 904. In this regard, paint may be applied "internal" to the outer edges of the coating 904 such that, when heated, the coating material is removed in a mounting area MA. The mounting area MA may, for example, accommodate a rearview mirror and/or other electronics, and the coating 904 may be a conductive coating that received a current in order to heat up and defrost the window. In certain example embodiments, one more mounting areas may be provided in the shown and/or other locations.

Figure 10:
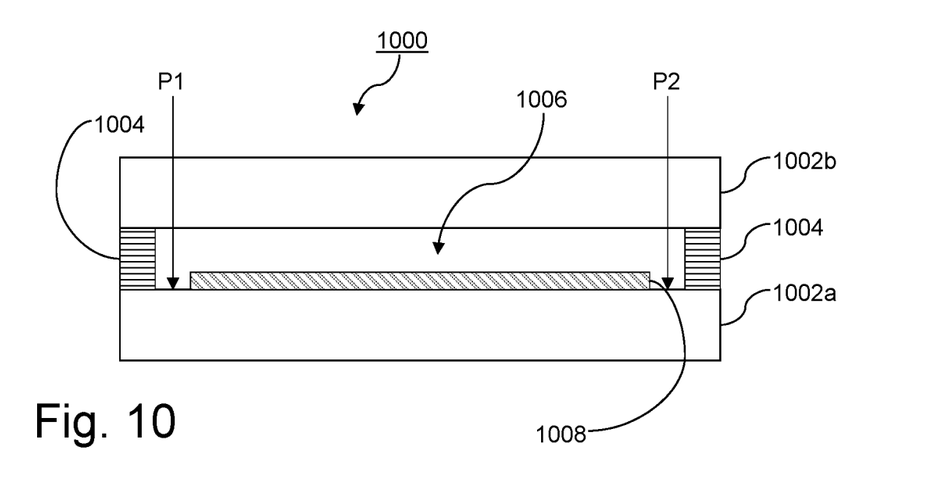
FIG. 10 is a schematic, cross-sectional view of an insulating glass unit including a coated article having peripheral edges of the coating thereof removed using the techniques of certain example embodiments.

FIG. 10 is a schematic, cross-sectional view of an IGU 1000 including a coated article 1002a having peripheral edges of the coating 1008 thereof removed using the techniques of certain example embodiments. The example IGU 1000 of FIG. 10 includes first and second substantially parallel, spaced apart substrates 1002a and 1002b. In this arrangement, an air gap 1006 (which may be filled with oxygen and/or an inert gas such as Ar, Kr, Xe, and/or the like) is at least partially defined by the first and second substrates 1002a and 1002b and the edge spacer 1004.

The first substrate 1002a in FIG. 10 may be structured similar to the FIG. 7 example substrate 700, e.g., in that the coating 1008 may be removed proximate to peripheral areas of the substrate 1002a. Doing so may allow the edge spacer 1004 better adhere to the inner surfaces of the first and second substrates 1002a and 1002b than it otherwise would adhere to the inner surface of the second substrate 1002b and the coating 1008. This may help reduce the likelihood of breakage, gas seeping out of the cavity 1006, moisture seeping into the cavity 1006, etc. The coating 1008 in this example may be an antireflective (AR) coating, for example. In certain example embodiments, multiple major surfaces of the IGU 1000 may support a coating such as, for example, an antireflective coating. It will be appreciated from the FIG. 10 example view that the peripheral edges P1 and P2 (and elsewhere) where the coating is removed may be "over-deleted," e.g., to provide some additional tolerance for the spacer 1004, thermal and/or wind load induced movement of the substrate(s) relative to one another and/or relative to the spacer, etc.

Figure 11:
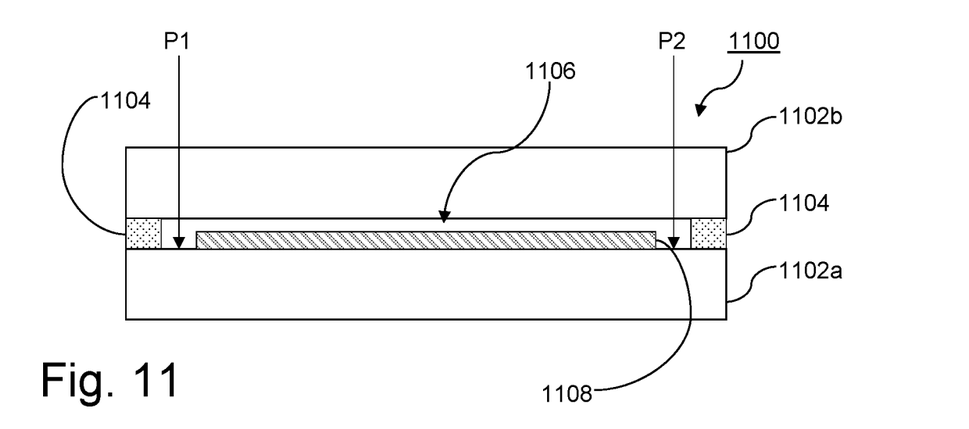
FIG. 11 is a schematic, cross-sectional view of a vacuum insulating glass unit including a coated article having peripheral edges of the coating thereof removed using the techniques of certain example embodiments.

FIG. 11 is a schematic, cross-sectional view of a vacuum insulating glass unit 1100 including a coated article 1102a having peripheral edges of the coating 1108 thereof removed using the techniques of certain example embodiments. FIG. 11 is similar to FIG. 10 in that first and second substantially parallel, spaced apart substrates 1102a and 1102b, together with hermetic edge seal 1104, form an gap 1106 therebetween, and in that the first substrate 1102a supports a coating 1108. The gap 1106 is evacuated to a pressure less than atmospheric, and the edge seal 1104 may be formed from a glass frit or other material. A plurality of spacers may help maintain the first and second substrates in substantially parallel, spaced apart relation to one another. Because the presence of the coating 1108 may provide for a weak and/or easily breakable seal, it may be removed from the edges proximate to where the hermetic edge seal 1104 is to be formed.

It will be appreciated that areas of a coating that may be removed may be outside of, in, and/or within, an otherwise continuous and uninterrupted coating so as to form one, two, or more defined areas where the coating is located.

Although certain example embodiments have been described in connection with sputter-deposited thin film coatings, it will be appreciated that the example techniques described herein may be used in connection with coatings formed in other ways. For example, the paint material described herein may be used to remove other physical vapor deposition (PVD) deposited coatings, coatings formed from sol gels, combustion deposition deposited coatings, and/or the like.

The terms "heat treatment" and "heat treating" as used herein include heating the article to a temperature sufficient to achieve thermal tempering and/or heat strengthening of the glass inclusive article. This definition includes, for example, heating a coated article in an oven or furnace at a temperature of at least about 550 degrees C., more preferably at least about 580 degrees C., more preferably at least about 600 degrees C., more preferably at least about 620 degrees C., and most preferably at least about 650 degrees C. for a sufficient period to allow tempering and/or heat strengthening. This may be for at least about two minutes, or up to about 10 minutes, in certain example embodiments.

As used herein, the terms "on," "supported by," and the like should not be interpreted to mean that two elements are directly adjacent to one another unless explicitly stated. In other words, a first layer may be said to be "on" or "supported by" a second layer, even if there are one or more layers therebetween.

In certain example embodiments, there is provided a method of making a coated article including a sputter-deposited coating supported by a glass substrate. A coating-dissolving material is applied over and contacting the sputter-deposited coating in one or more areas in which the sputter-deposited coating is to be removed. The glass substrate with the coating-dissolving material applied over and contacting the sputter-deposited coating is heated at a temperature of 500-700 degrees C. for no more than 10 minutes, with the heating causing the sputter-deposited coating under the coating-dissolving material to be at least partially damaged in the one or more areas in which the sputter-deposited coating is to be removed but not causing undesired damage to the sputter-deposited coating in other areas. Following the heating, the glass substrate is washed to remove excess material(s) from the glass substrate in the one or more areas in which the sputter-deposited coating is to be removed, in making the coated article. The coating comprises a plurality of dielectric layers.

In addition to the features of the previous paragraph, in certain example embodiments, the coating-dissolving material may be a paint, e.g., a ceramic paint.

In addition to the features of either of the two previous paragraphs, in certain example embodiments, the sputter-deposited coating may be a multilayer silver-inclusive low-emissivity coating comprising at least first and second Ag-based layers, with a first set of dielectric layers being located between the first Ag-based layer and the substrate, with a second set of dielectric layers being located between the first and second Ag-based layers, and with a third set of dielectric layers being located over the second Ag-based layer; and the first, second, and third sets of dielectric layers differ from one another in terms of number and/or types of layers therein. Alternatively, in addition to the features of either of the two previous paragraphs, in certain example embodiments, the sputter-deposited coating may be an anti-reflective coating.

In addition to the features of any of the three previous paragraphs, in certain example embodiments, the sputter-deposited coating may block and/or reflect UV light.

In addition to the features of any of the four previous paragraphs, in certain example embodiments, the one or more areas in which the sputter-deposited coating is to be removed may include peripheral edges of the glass substrate.

In addition to the features of any of the five previous paragraphs, in certain example embodiments, the one or more areas in which the sputter-deposited coating is to be removed may at least partially define one or more electrically isolating regions of the glass substrate.

In addition to the features of any of the six previous paragraphs, in certain example embodiments, the heating may be performed in connection with bending of the glass substrate.

In addition to the features of any of the seven previous paragraphs, in certain example embodiments, the coating may be non-conductive and/or may lack any layers comprising ITO.

In addition to the features of any of the eight previous paragraphs, in certain example embodiments, the heating may be performed in connection with thermal tempering of the glass substrate.

In addition to the features of any of the nine previous paragraphs, in certain example embodiments, the heating may be performed at a temperature range of 500-680 degrees C., e.g., 580-650 degrees C.

In certain example embodiments, there is provided a method of making a coated article including a sputter-deposited coating supported by a glass substrate. The glass substrate with a coating-dissolving material applied over and contacting the sputter-deposited coating in one or more areas in which the sputter-deposited coating is to be removed is heated, with the heating at least partially dissolving the sputter-deposited coating in the one or more areas in which the sputter-deposited coating is to be removed but elsewhere not dissolving the sputter-deposited coating, the heating being performed in connection with heat treatment and/or heat bending of the glass substrate. Following the heating, the glass substrate is washed to remove excess material(s) from the glass substrate in the one or more areas in which the sputter-deposited coating is to be removed, in making the coated article.

In addition to the features of the previous paragraph, in certain example embodiments, the washing may be performed using water.

In addition to the features of either of the two previous paragraphs, in certain example embodiments, the coating-dissolving material may be a ceramic paint.

In addition to the features of any of the three previous paragraphs, in certain example embodiments, the sputter-deposited coating may be a functional coating comprising multiple thin film layers, e.g., with at least two of the thin film layers potentially comprising Ag.

In certain example embodiments, there is provided a method of making an insulating glass unit, with the method comprising connecting together, in substantially parallel spaced-apart relation to one another, a coated article made according to any of the 14 previous paragraphs and another glass substrate, in connection with a peripheral edge seal. Similarly, in certain example embodiments, there is provided a method of making an automotive component, with the method comprising having a coated article made according to any of the 14 previous paragraphs, with the one or more areas in which the sputter-deposited coating is to be removed being bonding area(s); and bonding one or more components to the substrate in the bonding area(s).

In certain example embodiments, there is provided an intermediate coated article, comprising: a glass substrate; a sputter-deposited coating supported by the glass substrate; and a coating-dissolving material applied over and contacting the sputter-deposited coating in one or more areas in which the sputter-deposited coating is to be removed, the coating-dissolving material having a composition selected so as to be heatable at temperatures used in heat treatment and/or heat bending of the glass substrate to cause the sputter-deposited coating to dissolve in the one or more areas in which the sputter-deposited coating is to be removed and to thereafter be removable by washing.

In addition to the features of the previous paragraph, in certain example embodiments, the coating-dissolving material may be a ceramic paint that, after heating, is removable by washing with water; and/or the sputter-deposited coating may be a functional coating comprising multiple thin film layers.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A method of making a coated article including a sputter-deposited coating supported by a glass substrate, the method comprising:

applying a coating-dissolving material comprising ceramic paint over and contacting the sputter-deposited coating in one or more areas in which the sputter-deposited coating is to be removed, wherein the ceramic paint comprises oxides of phosphorous and sodium;

heating the glass substrate with the coating-dissolving material comprising ceramic paint applied over and contacting the sputter-deposited coating at a temperature of 580-650 degrees C. for no more than 10 minutes, the heating causing the sputter-deposited coating under the coating-dissolving material to be at least partially damaged in the one or more areas in which the sputter-deposited coating is to be removed but not causing undesired damage to the sputter-deposited coating in other areas; and following the heating, washing the glass substrate to remove excess material(s) from the glass substrate in the one or more areas in which the sputter-deposited coating is to be removed, in making the coated article, wherein the coating comprises a plurality of dielectric layers.

2. The method of claim 1, wherein the sputter-deposited coating is a multilayer silver-inclusive low-emissivity coating comprising at least first and second Ag-based layers, a first set of dielectric layers being located between the first Ag-based layer and the substrate, a second set of dielectric layers being located between the first and second Ag-based layers, and a third set of dielectric layers being located over the second Ag-based layer; and wherein the first, second, and third sets of dielectric layers differ from one another in terms of number and/or types of layers therein.

3. The method of claim 1, wherein the sputter-deposited coating is an antireflective coating.

4. The method of claim 1, wherein the sputter-deposited coating blocks and/or reflects UV light.

5. The method of claim 1, wherein the one or more areas in which the sputter-deposited coating is to be removed include peripheral edges of the glass substrate.

6. The method of claim 1, wherein the one or more areas in which the sputter-deposited coating is to be removed at least partially define one or more electrically isolating regions of the glass substrate.

7. The method of claim 1, wherein the heating is performed in connection with bending of the glass substrate.

8. The method of claim 1, wherein the coating is non-conductive and lacks any layers comprising ITO.

9. The method of claim 1, wherein the heating is performed in connection with thermal tempering of the glass substrate.

* * * * *